Feb. 12, 1935. G. F. KERNS 1,991,253
FISHING TACKLE
Original Filed July 26, 1932
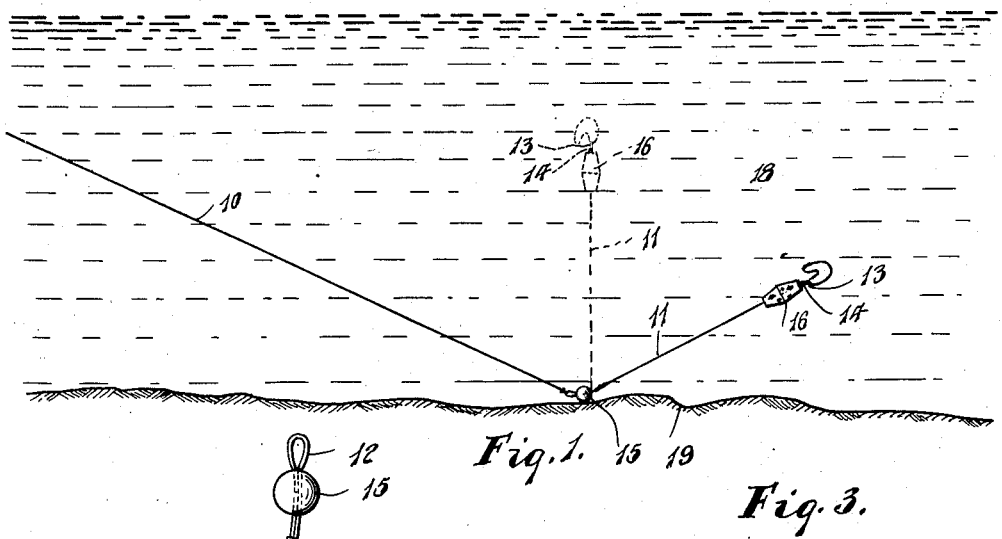
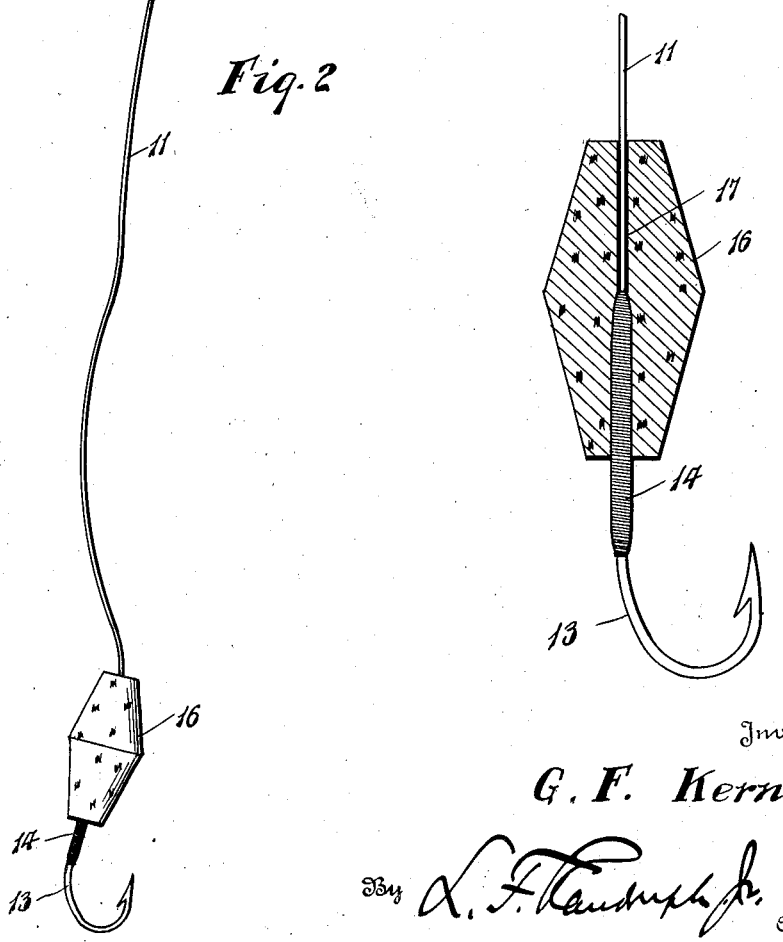
Inventor
G. F. Kerns
By L. F. Randolph Jr.
Attorney Patented Feb. 12, 1935

1,991,253

UNITED STATES PATENT OFFICE 1,991,253

FISHING TACKLE

George F. Kerns, Fairmont, W. Va.

Application July 26, 1932, Serial No. 624,829
Renewed July 12, 1934

2 Claims. (Cl. 43—27)

The invention relates to fishing tackle and has for its object the provision of improvement in fishing lines whereby the hook and the bait thereon may be held above the bed of the body of water where used so as to make the bait more attractive to the fish, and also prevent live bait from hiding under rocks or other debris on the bed of the body of water, and also eliminate to a considerable extent catching eels, cat-fish, toad-fish, and other fish having their habitat in the muddy bottom of water courses and bodies.

In the drawing:

Figure 1 is a view of my improved fishing tackle showing its position in a body of water when in use, Figure 2 is a view in elevation of my improvement as applied to a snell and hook, and Figure 3 is a fragmentary view showing the float in cross section.

The improved fishing tackle comprises a line 10 on which is secured one end of a snell or snood 11 through a loop 12 formed at one end of the snell, the other end of the snell having a hook 13 secured thereto as shown at 14. Secured to the snell 11 is a sinker 15, which is preferably a split shot to receive the loop 12 and be secured thereto by pressing the parts of the sinker on the opposite sides of the split portion into intimate engagement with the snell loop. By securing the sinker to the loop, as stated, the loop is strengthened and the portion in which the line is inserted is restricted, in addition to the advantages gained by locating the sinker in combination with the position of the float, as hereinafter stated. Secured to the hook and the adjacent portion of the snell is a float 16 that may be of cork or other buoyant material, having an opening 17 therethrough to receive the snell and the adjacent portion of the hook, and to be secured thereto by means of water-proof cement.

In Figure 1 the fishing tackle is shown in use in a body of water designated 18, and the sinker 15 at rest on the bed 19 of the body of water, and the float 16 will raise the snell as shown, the position, approximately, of the parts in a flowing stream being shown in full lines, while the approximate positions of the parts in a still body of water, such for instance as a lake or pond, is designated by means of the broken lines in Figure 1.

It will be apparent that the length of the snell 11 will govern the position of the bait end when the fishing tackle is in use, as it is desirable to raise the bait end of the snell sufficiently high above the bed of the body of water to prevent catching eels, cat-fish, toad-fish, and the like, that have their habitat in the muddy bottom of fishing ground, in addition to being a better lure for fish and preventing live bait from secreting itself in the rocks and debris at the bottom of the body of water.

What is claimed is:—

1. In fishing tackle, a line, a snell connected thereto and having a hook secured at one end thereof, a loop on the other end of the snell, a sinker secured to the loop to strengthen and restrict it, and a float secured to the hook and to the snell adjacent thereto.

2. An article of manufacture, comprising a snelled fish hook, a float secured to the stem of the hook and the snell, the free end of the snell being returned on and secured to the snell providing an elongated loop, and a sinker secured to said loop and thereby restricting and strengthening it.

GEORGE F. KERNS.